United States Patent
Lee et al.

(10) Patent No.: US 12,063,522 B2
(45) Date of Patent: Aug. 13, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 17/451,058

(22) Filed: Oct. 15, 2021

(65) Prior Publication Data

US 2022/0124514 A1  Apr. 21, 2022

(30) Foreign Application Priority Data

Oct. 15, 2020 (KR) ........................ 10-2020-0133562

(51) Int. Cl.
*H04W 16/28* (2009.01)
*H04W 24/08* (2009.01)
*H04W 24/10* (2009.01)
*H04W 74/0833* (2024.01)
*H04W 76/19* (2018.01)

(52) U.S. Cl.
CPC ........... *H04W 16/28* (2013.01); *H04W 24/08* (2013.01); *H04W 24/10* (2013.01); *H04W 74/0841* (2013.01); *H04W 76/19* (2018.02)

(58) Field of Classification Search
CPC ..... H04W 16/28; H04W 24/08; H04W 24/10; H04W 74/0841; H04W 76/19; H04B 7/0632; H04B 7/0695; H04L 5/0048
See application file for complete search history.

(56) References Cited

U.S. PATENT DOCUMENTS

2022/0116802 A1* 4/2022 Kim ..................... H04W 76/27

* cited by examiner

*Primary Examiner* — Eric Myers
(74) *Attorney, Agent, or Firm* — LEE, HONG, DEGERMAN, KANG & WAIMEY

(57) ABSTRACT

Various embodiments relate to a next-generation wireless communication system for supporting higher data transmission rate, beyond a 4th generation (4G) wireless communication system. According to various embodiments, a method of transmitting and receiving a signal in a wireless communication system and an apparatus supporting the same may be provided, and other various embodiments may be provided.

8 Claims, 18 Drawing Sheets

FIG. 9

| PRACH configuration index | Symbol Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | 81 | A1 | | A1 | | A1 | | A1 | | A1 | | A1 | | | |
| | 82 | | | | | | | | | A1 | | A1 | | A1 | |
| | 100 | | | | | | | | | A2 | | | | | |
| | 101 | A2 | | | | A2 | | | | A2 | | | | | |
| | 127 | | | A3 | | | | | | A3 | | | | | |
| | 128 | | | | | | | | | A3 | | | | | |
| | 142 | | | B1 | | B1 | | B1 | | B1 | | B1 | | B1 | |
| | 143 | | | | | | | | | B1 | | B1 | | B1 | |
| | 221 | | | A1 | | A1 | | A1 | | A1 | | A1 | | A1 | |
| | 222 | | | | | | | | | A1 | | A1 | | A1 | |
| | 235 | A2 | | | | A2 | | | | B2 | | | | | |
| | 236 | | | | | A2 | | | | B2 | | | | | |
| | 251 | | | A3 | | | | B3 | | | | | | | |
| | 252 | | | A3 | | | | B3 | | | | | | | |

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119 (a), this application claims the benefit of an earlier filing date and right of priority to Korean Patent Application No. 10-2020-0133562, filed on Oct. 15, 2020, the contents of which is hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to various embodiments, provided herein is a method of transmitting and receiving a signal by a user equipment (UE) in a wireless communication system, including receiving radio link monitoring (RLM) configuration information for beam failure detection (BFD); receiving a reference signal (RS) related to RLM; measuring the RS; performing a BFD procedure based on the configuration information and plural predefined conditions, none of which is satisfied; and performing a relaxed BFD procedure or temporarily stopping the BFD procedure, based on the configuration information and at least one condition satisfied among the plural predefined conditions. The configuration information may include information related to a normal BFD procedure and information related to the relaxed BFD procedure.

Alternatively, the plural predefined conditions may include 1) a case in which a measurement value of radio link quality based on the RS is greater than or equal to a threshold for a predetermined time, 2) a case in which the number of in-synchronization indications is greater than or equal to a predetermined number for the predetermined time, and 3) a case in which the number of out-of-synchronization indications is less than or equal to a predetermined number for the predetermined time.

Alternatively, the method may include performing the relaxed BFD procedure by monitoring the RS based on information related to the relaxed BFD procedure.

Alternatively, the number of RSs configured for the relaxed BFD procedure may be less than or equal to the number of RSs configured for the normal BFD procedure.

Alternatively, the information related to the relaxed BFD procedure may include at least one of information about an RS measurement time interval for the relaxed BFD procedure, information about the number of times of RS measurement for the relaxed BFD procedure, or information about an RS measurement period for the relaxed BFD procedure.

Alternatively, the RS measurement time interval for the relaxed BFD procedure may be set to be greater than or equal to an RS measurement time interval for the BFD procedure, the number of times of RS measurement for the relaxed BFD procedure may be set to be less than or equal to the number of times of RS measurement for the BFD procedure, and the RS measurement period for the relaxed BFD may be set to be greater than or equal to an RS measurement period for the BFD procedure.

Alternatively, the RLM configuration information includes information about the number of times of occurrence of a first beam failure event for triggering beam failure recovery (BFR) based on performance of the relaxed BFD procedure and information about the number of times of occurrence of a second beam failure event for triggering BFR based on performance of the normal BFD procedure, and the number of times of the first beam failure event may be differently set from the number of times of the second beam failure event.

Alternatively, the method may include receiving BFR configuration information including random access channel (RACH) resources and candidate beams, for BFR; triggering an RACH for BFR based on the number of times of occurrence of a beam failure event detected upon performing the relaxed BFD procedure, which is greater than or equal to the number of times of occurrence of the first beam failure event; and transmitting an RACH preamble on a first RACH preamble resource for BFR triggered by the relaxed BFD procedure, based on the BFR configuration information.

Alternatively, the BFR configuration information may include a first RACH preamble resource for BFR triggered by the relaxed BFD procedure and a second RACH preamble resource for BFR triggered by the normal BFD procedure. The first RACH preamble resource and the second RACH preamble resource may be differently configured, and the RACH for BFR may be triggered based on the RLM configuration information.

Alternatively, performing the relaxed BFD procedure may include: applying a separate timer value for the relaxed BFD procedure by restarting a timer started before the relaxed BFD procedure is performed, and the separate timer value for the relaxed BFD procedure may be differently configured from a timer value for the normal BFD procedure.

Alternatively, temporarily stopping the BFD procedure may include: initializing all BFD parameter variables; and cancelling all triggered BFR procedures.

Alternatively, the method may include: based on the plural predefined conditions, none of which is satisfied, after the relaxed BFD procedure is performed or the BFD procedure is temporarily stopped, transmitting a specific condition release report representing that all of the plural predefined conditions are not satisfied; receiving indication information about deactivation of the relaxed BFD procedure; and performing the normal BFD procedure.

According to various embodiments, a non-volatile computer readable medium in which program code for performing the method is recorded may be provided.

According to various embodiments, provided herein is a user equipment (UE) operating in a wireless communication system, including: a transceiver; and one or more processors connected to the transceiver. The one or more processors may be configured to: receive radio link monitoring (RLM) configuration information for beam failure detection (BFD); receive a reference signal (RS) related to RLM; measure the RS; perform a BFD procedure based on the configuration information and plural predefined conditions, none of which is satisfied; and perform a relaxed BFD procedure or temporarily stop the BFD procedure, based on the configuration information and at least one condition satisfied among the plural predefined conditions. The configuration information may include information related to a normal BFD procedure and information related to the relaxed BFD procedure.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 9 illustrates an example of a RACH occasion defined in one RACH slot in the NR system;

DETAILED DESCRIPTION

Figure 1:
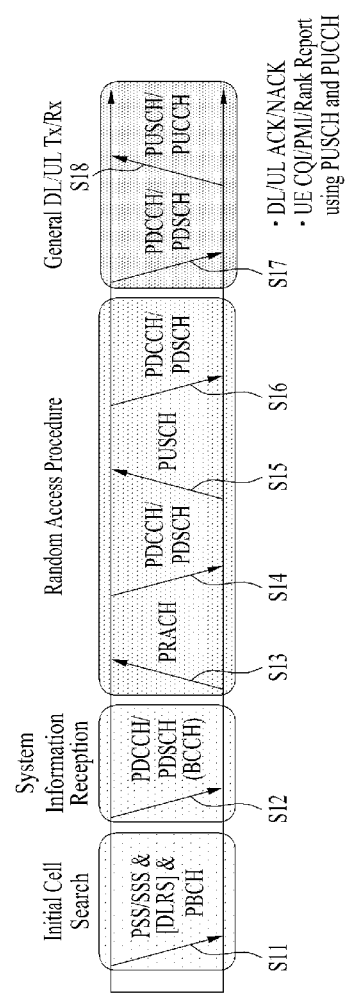
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control TS 38.214: Physical layer procedures for data
TS 38.300: NR and NG-RAN Overall Description
TS 38.321: Medium Access Control (MAC)
TS 38.331: Radio Resource Control (RRC) protocol specification

ABBREVIATIONS AND TERMS

PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
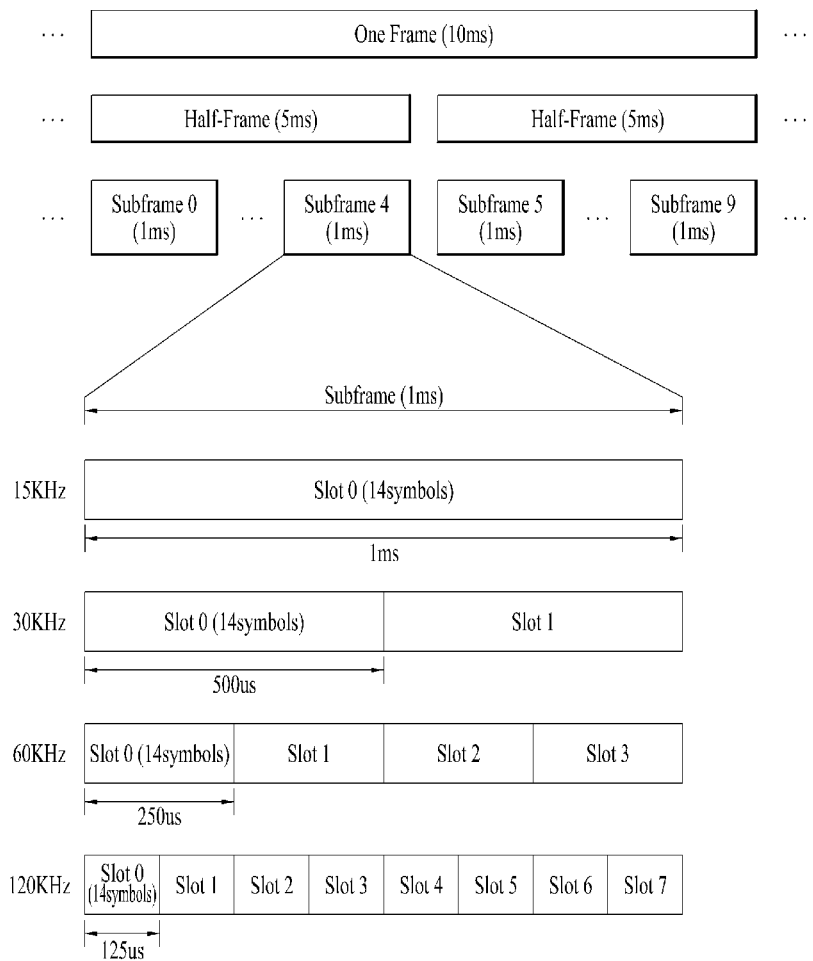
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N_{symb}^{slot}$: Number of symbols in a slot
*$N_{slot}^{frame,u}$: Number of slots in a frame
*$N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15*2$^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
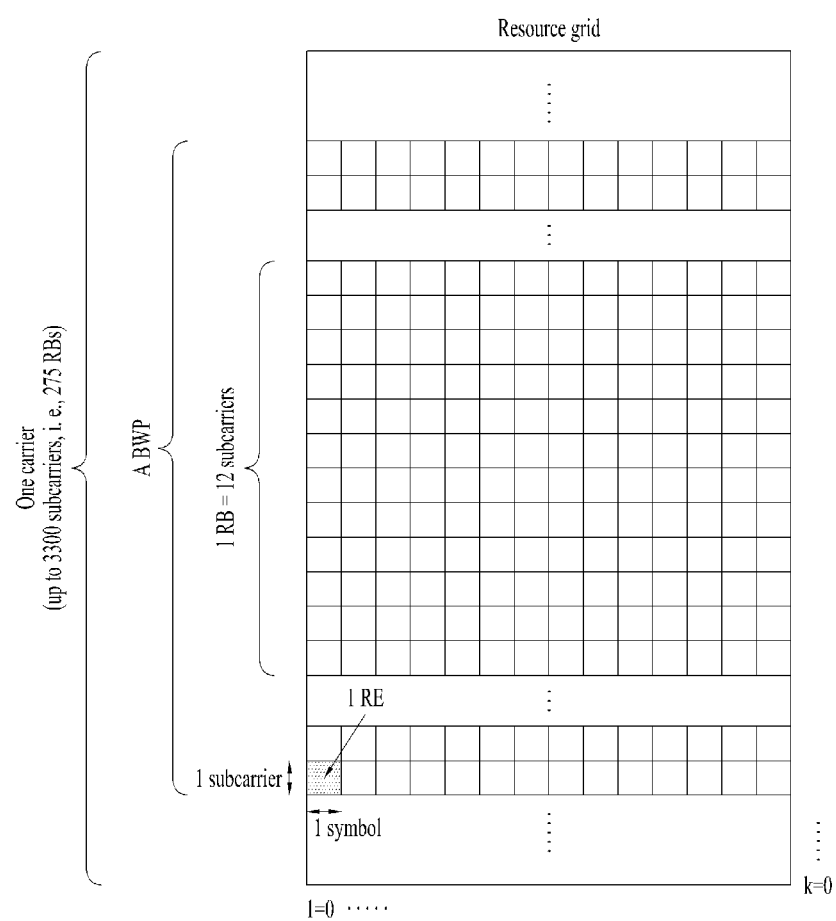
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
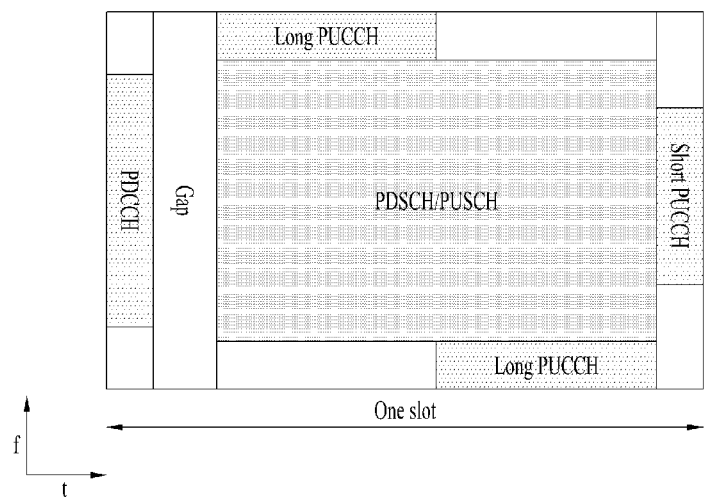
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
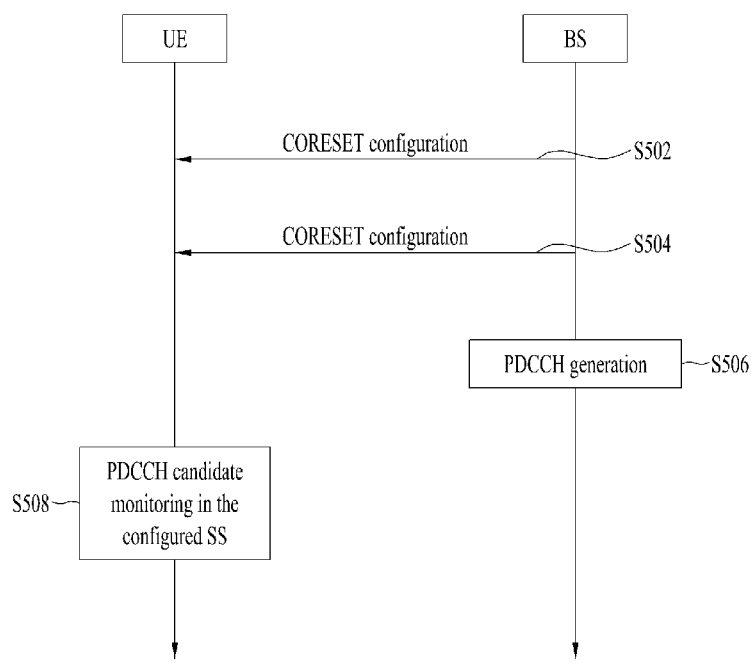
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |

TABLE 3-continued

| Type | Search Space | RNTI | Use Case |
|---|---|---|---|
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.
  Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.
  Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIB s of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RB s and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB} > 23$ for FR1 and if $k_{SSB} > 11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.—SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
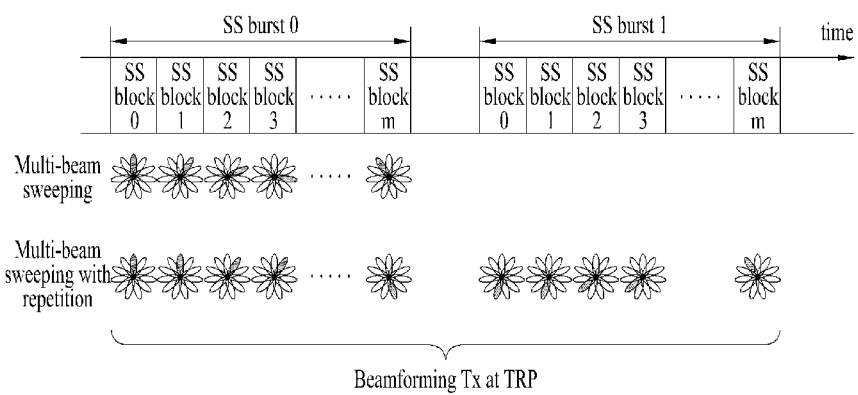
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
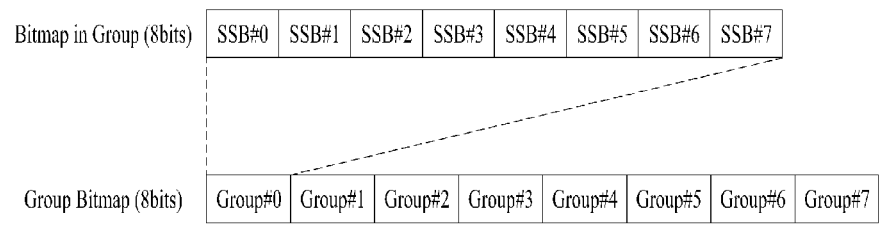
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 In NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
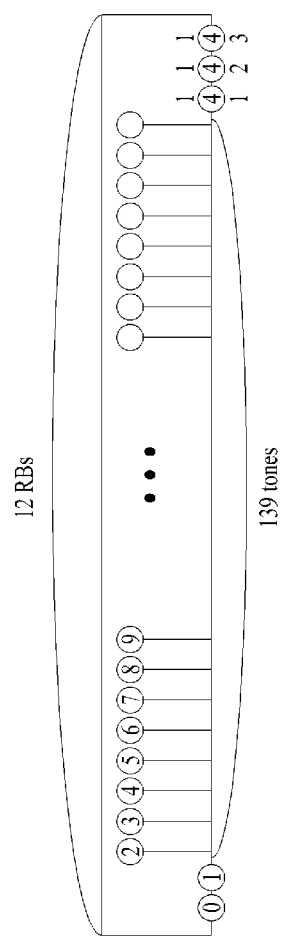
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, $\mu$ is 1. Table 5 shows Preamble formats for $L_{RA}=139$ and $\Delta f^{RA}=15 \times 2^\mu$ kHz, where $\mu \in \{0,1,2,3\}$, $\kappa = T_s/T_c = 64$.

TABLE 5

| Format | $L_{RA}$ | $\Delta f^{RA}$ | $N_u$ | $N_{CP}^{RA}$ |
| --- | --- | --- | --- | --- |
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$ mod $x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
| --- | --- | --- | --- | --- | --- | --- | --- | --- |
| | | x | y | | | | | |
| 81 | A1 | 1 | 0 | 4, 9 | 0 | 1 | 6 | 2 |
| 82 | A1 | 1 | 0 | 7, 9 | 7 | 1 | 3 | 2 |

TABLE 6-continued

| PRACH Configuration Index | Preamble format | $n_{SFN}\bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

Referring to Table 6, information about the number of ROs defined in a RACH slot for each preamble format (i.e., $N_t^{RA,\ slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

Beam Management

Beam management (BM) procedures defined in new radio (NR) will now be described. The BM procedures as a layer 1 (L1)/layer 2 (L2) procedures for acquiring and maintaining a set of beams of a BS (e.g., a gNB, a TRP, etc.) and/or a terminal (e.g., UE), that may be used for DL and UL transmission/reception, may include the following procedures and terms.

Beam measurement: Operation of measuring characteristics of a received beamforming signal by a gNB or a UE.

Beam determination: Operation of selecting a transmit (Tx) beam/receive (Rx) beam of the gNB and the UE by the gNB and the UE.

Beam sweeping: Operation of covering a spatial region using a Tx and/or Rx beam for a predetermined time interval in a predetermined manner.

Beam report: Operation of reporting information of a beamformed signal based on beam measurement.

For beam measurement, a synchronization signal (SS) block (or SS/physical broadcast channel (PBCH) block) (SSB) or a channel state information reference signal (CSI-RS) is used on DL, and a sounding reference signal (SRS) is used on UL. In RRC_CONNECTED, the UE may measure a plurality of beams (or at least one beam) of a cell and average measurement results (reference signal received power (RSRP), reference signal received quality (RSRQ), signal-to-interference-plus-noise ratio (SINR), etc.) to derive cell quality. Therethrough, the UE may be configured to consider a subset of detected beam(s).

Beam measurement-related filtering occurs at two different levels (a physical layer deriving beam quality and an RRC level deriving cell quality in multiple beams). Cell quality from beam measurement is derived in the same manner for serving cell(s) and non-serving cell(s).

Figure 10:
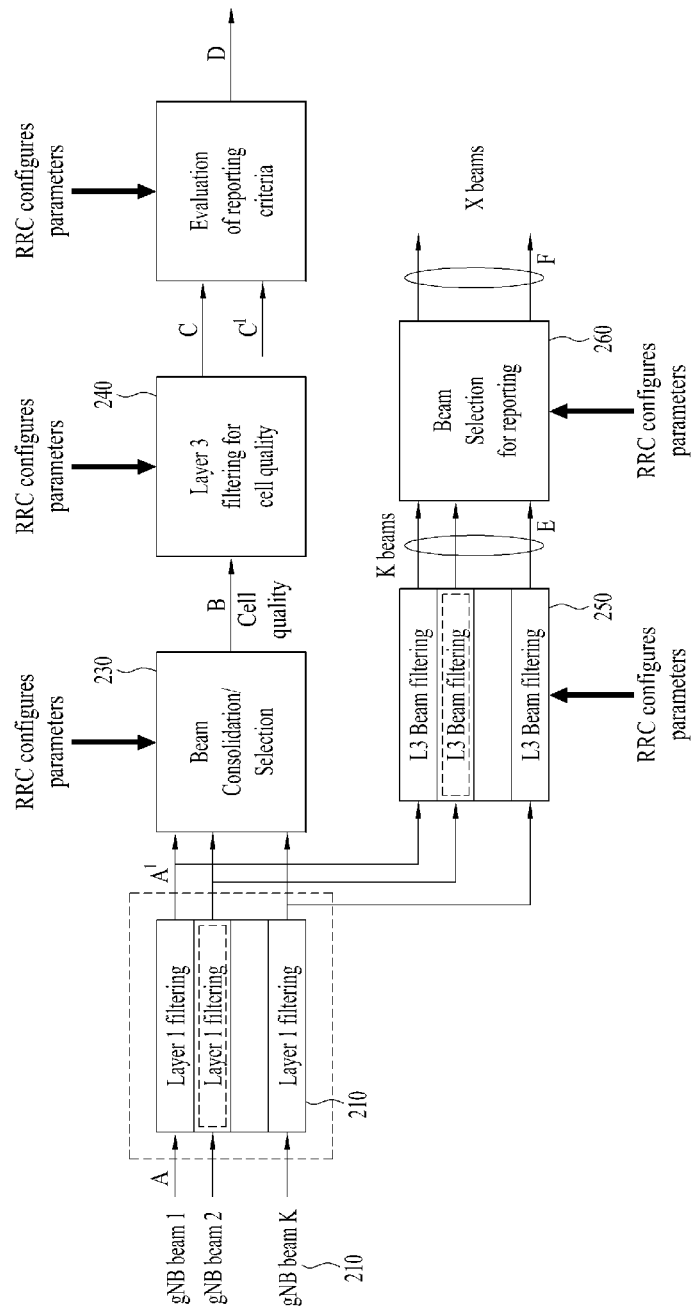
FIG. 10 illustrates an example of a beam related measurement model.

If the UE is configured to report measurement results for specific beam(s) by the gNB, a measurement report includes measurement results for X best beams. The beam measurement results may be reported as L1-RSRP. In FIG. 10, K beams (gNB beam 1, gNB beam 2, . . . , gNB beam k) 210 are configured for L3 mobility by the gNB and correspond to measurement of an SSB or a CSI-RS resource detected by the UE in L1. In FIG. 10, layer 1 filtering 220 refers to filtering of internal layer 1 of input measured at a point A. Beam consolidation/selection 230 is consolidated (or integrated) such that beam specific measurement derives cell quality. Layer 3 filtering 240 for cell quality refers to filtering performed for measurement provided at a point B. The UE evaluates reporting criteria whenever a new measurement result is reported at least at points C and C1. D corresponds to measurement report information (message) transmitted through a radio interface. L3 beam filtering 250 performs filtering for measurement provided at point A1 (beam specific measurement). Beam selection 260 for beam reporting selects X measurement values from measurement provided at a point E. F indicates beam measurement information included in a measurement report (transmitted) through the radio interface.

The BM procedures may be divided into (1) a DL BM procedure using an SS/PBCH block or a CSI-RS and (2) a UL BM procedure using an SRS. Further, each BM procedure may include Tx beam sweeping for determining a Tx beam and Rx beam sweeping for determining an Rx beam.

Next, a beam failure detection and beam failure recovery (BFR) procedures will be described.

In a beamformed system, radio link failure (RLF) may frequently occur due to rotation, movement, or beam blockage of the UE. Accordingly, in order to prevent frequent occurrence of RLF, BFR is supported in NR. BFR may be similar to an RLF recovery procedure and may be supported when the UE is aware of new candidate beam(s).

For convenience of understanding, (1) radio link monitoring and (2) a link recovery procedure will be briefly described first.

(1) Radio Link Monitoring

The requirements in this clause apply for radio link monitoring on:

PCell in SA NR, NR-DC and NE-DC operation mode,

PSCell in NR-DC and EN-DC operation mode.

The UE shall monitor the downlink radio link quality based on the reference signal configured as RLM-RS resource(s) in order to detect the downlink radio link quality of the PCell and PSCell as specified in TS 38.213. The configured RLM-RS resources can be all SSBs, or all CSI-RSs, or a mix of SSBs and CSI-RSs. UE is not required to perform RLM outside the active DL BWP.

On each RLM-RS resource, the UE shall estimate the downlink radio link quality and compare it to the thresholds Qout and Qin for the purpose of monitoring downlink radio link quality of the cell.

The threshold Qout is defined as the level at which the downlink radio link cannot be reliably received and shall correspond to the out-of-sync block error rate (BLERout) as defined in Table 8 (Table 8 is Table 8.1.1-1: Out-of-sync and in-sync block error rates, see TS 38.213). For SSB based radio link monitoring, Qout_SSB is derived based on the hypothetical PDCCH transmission parameters listed in Table 8. For CSI-RS based radio link monitoring, Qout_CSI-RS is derived based on the hypothetical PDCCH transmission parameters listed in Table 8.1.3.1-1, TS38.213.

The threshold Qin is defined as the level at which the downlink radio link quality can be received with significantly higher reliability than at Qout and shall correspond to the in-sync block error rate (BLERin) as defined in Table 8. For SSB based radio link monitoring, Qin_SSB is derived based on the hypothetical PDCCH transmission parameters listed in Table 8.1.2.1-2. For CSI-RS based radio link monitoring, Qin_CSI-RS is derived based on the hypothetical PDCCH transmission parameters listed in Table 8.1.3.1-2, TS38.213.

The out-of-sync block error rate (BLERout) and in-sync block error rate (BLERin) are determined from the network configuration via parameter rlmInSyncOutOfSyncThreshold signalled by higher layers. When UE is not configured with rlmInSyncOutOfSyncThreshold from the network, UE determines out-of-sync and in-sync block error rates from Configuration #0 in Table 8 by default. All requirements in clause 8.1 (TS 38.213 clause 8.1) are applicable for BLER Configuration #0 in Table 8.

TABLE 8

| Configuration | $BLER_{out}$ | $BLER_{in}$ |
| --- | --- | --- |
| 0 | 10% | 2% |

UE shall be able to monitor up to NRLM RLM-RS resources of the same or different types in each corresponding carrier frequency range, depending on a maximum number of candidate SSBs per half frame according to TS 38.213, where NRLM is specified in Table 9 (Table 9 is Table 8.1.1-2, TS38.213) and meet the requirements as specified in clause 8.1, TS38.213. UE is not required to meet the requirements in clause 8.1 if RLM-RS is not configured and no state for PDCCH is activated.

TABLE 9

| Carries frequency range of PCell/PSCell | $L_{max}$ | Maximum number of RLM-RS resources, $N_{RLM}$ |
| --- | --- | --- |
| FR1, ≤3 GHz[Note] | 4 | 2 |
| FR1, >3 GHz[Note] | 8 | 4 |
| FR2 | 64 | 8 |

NOTE:
For unpaired spectrum operation with Case C—30 kHz SCS, 3 GHz is replaced by 2.4 GHz, as specified in clause 4.1 in TS 38.213 [3].

DL radio link quality of a primary cell is monitored by the UE for the purpose of indicating an out-of-synchronization or in-synchronization state to higher layers. A cell used in this specification may be expressed as a component carrier, a carrier, a bandwidth (BW), or the like. The UE does not need to monitor DL radio link quality in a DL BWP other than an active DL BWP on the primary cell. The UE may be configured for each DL BWP of a special cell (SpCell) having a set of resource indexes through a corresponding set of (higher layer parameter) RadioLinkMonitoringRS for radio link monitoring by higher layer parameter failureDetectionResources. The higher layer parameter RadioLinkMonitoringRS having a CSI-RS resource configuration index (csi-RS-Index) or an SS/PBCH block index (ssb-Index) is provided to the UE. When RadioLinkMonitoringRS is not provided to the UE and the UE is provided with a TCI state for a PDCCH including one or more RSs including one or more of a CSI-RS and/or an SS/PBCH block, if an active TCI state for the PDCCH includes only one RS, the UE uses, for radio link monitoring, the RS provided with respect to the active TCI state for the PDCCH.

If the active TCI state for the PDCCH includes two RSs, the UE expects that one RS will have QCL-TypeD and the UE will use one RS for radio link monitoring. Here, the UE does not expect that the two RSs will have QCL-TypeD.

The UE does not use an aperiodic RS for radio link monitoring.

Table 10 below shows an example of a RadioLinkMonitoringConfig IE. The RadioLinkMonitoringConfig IE is used to configure radio link monitoring for detection of beam failure and/or cell radio link failure.

TABLE 10

```
-- ASN1START
-- TAG-RADIOLINKMONITORINGCONFIG-START
RadioLinkMonitoringConfig ::=         SEQUENCE {
    faliureDectectionResourcesToAddModList    SEQUENCE (SIZE(1..maxNrofFailureDetectionRecources)) OF RadioLinkMonitoringRS
      OPTIONAL,  -- Need N
    failureDetectionResourcesToReleaseList SEQUENCE (SIZE(1..maxNrofFailureDetectionResources)) OF RadioLinkMonitoringRS-Id OPTIONAL,-- Need N
    beamFailureInstanceMaxCount           ENUMERATED {n1, n2, n3, n4, n5, n6, n8, n10}
      OPTIONAL,  -- Need S
    beamFailureDetectionTimer             ENUMERATED {pbfd1, pbfd2, pbfd3, pbfd4, pbfd5, pbfd6, pbfd8, pbfd10}
      OPTIONAL,  -- Need R
    ...
}
RadioLinkMonitoringRS ::=             SEQUENCE {
    radioLinkMonitoringRS-Id              RadioLinkMonitoringRS-Id,
    purpose                               ENUMERATED {beamFailure, rif, both},
    detectionResource                     CHOICE {
```

TABLE 10-continued

```
    ssb-Index                    SSB-Index,
    csi-RS-Index                 NZP-CSI-RS-ResourceId
  },
  ...
}
-- TAG-RADIOLINKMONITORINGCONFIG-STOP
-- ASN1STOP
```

In Table 10, a beamFailureDetectionTimer parameter is a timer for beam failure detection.

A beamFailureInstanceMaxCount parameter indicates after how many beam failure events the UE triggers beam failure recovery.

A value n1 corresponds to one beam failure instance, and a value n2 corresponds to two beam failure instances. When a network reconfigures a corresponding field, the UE resets a counter related to on-goingbeamFailureDetectionTimer and beamFailureInstanceMaxCount.

If a corresponding field does not exist, the UE does not trigger beam failure recovery.

Table 11 shows an example of a BeamFailureRecoveryConfig IE.

The BeamFailureRecoveryConfig IE is used to configure RACH resources and candidate beams, for beam failure recovery, for the UE in a beam failure detection situation.

In Table 11, a beamFailureRecoveryTimer parameter is a parameter indicating a timer for beam failure recovery, and a value thereof is set to ms. A candidateBeamRSList parameter indicates a list of RSs (a CSI-RS and/or an SSB) for identifying random access (RA) parameters associated with candidate beams for recovery. A RecoverySearchSpaceId parameter indicates a search space used for a BFR random access response (RAR). When radio link quality is worse than a threshold Qout for all resources in a set of resources for radio link monitoring, a physical layer of the UE indicates out-of-synchronization to a higher layer in frames in which radio link quality is evaluated. If radio link quality for any resource in the set of the resources for radio link monitoring is better than a threshold Qin, the physical layer of the UE indicates in-synchronization to the higher layer in the frames in which radio link quality is evaluated.

TABLE 11

```
-- ASN1START
-- TAG-BEAM-FAILURE-RECOVERY-CONFIG-START
BeamFailureRecoveryConfig ::=    SEQUENCE {
    rootSequenceIndex-BFR            INTEGER (0..137)
        OPTIONAL,   -- Need M
    rach-ConfigBFR                   RACH-ConfigGeneric
        OPTIONAL,   -- Need M
    rsrp-ThresholdSSB                RSRP-Range
        OPTIONAL,   -- Need M
    candidateBeamRSList              SEQUENCE (SIZE(1..maxNrofCandidateBeams)) OF PRACH-ResourceDedicatedBFR
        OPTIONAL,   -- Need M
    ssb-perRACH-Occasion             ENUMERATED {oneEighth, oneFourth, oneHalf, one, two, four, eight, sixteen}   OPTIONAL,   -- Need M
    ra-ssb-OccasionMaskIndex         INTEGER (0..15)
        OPTIONAL,   -- Need M
    recoverySearchSpaceId            SearchSpaceId
        OPTIONAL,   -- Cond CF-BFR
    ra-Prioritization                RA-Prioritization
        OPTIONAL, -- Need R
    beamFailureRecoveryTimer         ENUMERATED {ms10, ms20, ms40, ms60, ms80, ms100, ms150, ms200}     OPTIONAL,   -- Need M
    ...
}
PRACH-ResourceDedicatedBFR :=    CHOICE {
    ssb                              BFR-SSB-Resource,
    csi-RS                           BFR-CSIRS-Resource
}
BFR-SSB-Resource ::=             SEQUENCE {
    ssb                              SSB-Index,
    ra-PreambleIndex                 INTEGER (0..63),
    ...
}
BFR-CSIRS-Resource ::=           SEQUENCE {
    csi-RS                           NZP-CSI-RS-ResourceId,
    ra-OccasionList                  SEQUENCE (SIZE(1..maxRA-OccasionPerCSIRS)) OF INTEGER (0..maxRA-Occasions-1)
        OPTIONAL,   -- Need R
    ra-PreambleIndex                 INTEGER (0..63)
        OPTIONAL,   -- Need R
    ...
}
-- TAG-BEAM-FAILURE-RECOVERY-CONFIG-STOP
-- ASN1STOP
```

(2) Link Recovery Procedure

For a serving cell, the UE is provided with a set q0 of periodic CSI-RS resource configuration indexes by a higher layer parameter failureDetectionResources and a set q1 of periodic CSI-RS resource configuration indexes and/or SS/PBCH block indexes by candidateBeamRSList for radio link quality measurement on the serving cell.

If the UE is not provided with failureDetectionResources, the UE determines the set q0 to include an SS/PBCH block index and a periodic CSI-RS resource configuration index, having the same value as an RS index in an RS set indicated by a TCI state for each control resource set used thereby for PDCCH monitoring.

A threshold Qout_LR is determined based on a default value of a higher layer parameter rlmInSyncOutOfSync-Threshold and a value provided by a higher layer parameter rsrp-ThresholdSSB. The UE evaluates radio link quality according to the set q0 of a resource configuration for the threshold Qout_LR. For the set q0, the UE evaluates radio link quality only according to a periodic CSI-RS resource configuration and SSBs, quasi-co-located (QCLed) with DM-RS reception of a PDCCH monitored thereby. The UE applies a threshold Qin_LR to an L1-RSRP measurement value obtained from an SS/PBCH block. The UE scales each CSI-RS received power to a value provided by powerControlOffsetSS and then applies the threshold Qin_LR to an L1-RSRP measurement value obtained for a CSI-RS resource. The physical layer of the UE provides an indication to the higher layer when radio link quality for all corresponding resource configurations in a set used thereby to evaluate radio link quality is worse than the threshold Qout_LR. The physical layer informs the higher layer of radio link quality based on periodic CSI-RS configuration or informs the higher layer of radio link quality when radio link quality is worse than the threshold Qout_LR having a period determined as a maximum value between the shortest period of the SS/PBCH block and 2 msec in the set q0 used by the UE to evaluate radio link quality.

In response to a request from the higher layer, the UE provides a periodic CSI-RS configuration index and/or an SS/PBCH block index from the set q1, and a corresponding L1-RSRP measurement value greater than or equal to a corresponding threshold to the higher layer.

The UE may be provided with a search space set provided by recoverySearchSpaceId and with a control resource set through a link in order to monitor a PDCCH in the control resource set. If the UE is provided with recoverySearchSpaceId, the UE does not expect that another search space will be provided to monitor the PDCCH in the control resource set associated with the search space set provided by recoverySearchSpaceId.

The above-described beam failure detection (BFD) and beam failure recovery (BFR) procedures will be continuously described. When beam failure is detected on a serving SSB or CSI-RS(s), a BFR procedure used to indicate a new SSB or CSI-RS to a serving gNB may be configured by RRC. RRC configures BeamFailureRecoveryConfig for BFD and BFR procedures.

Figure 11:
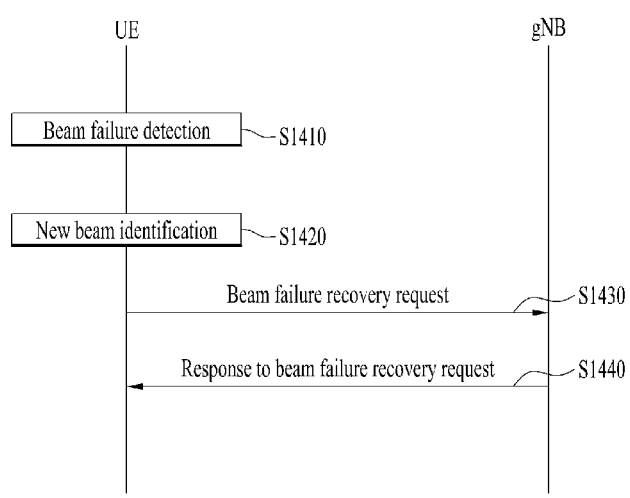
FIG. 11 illustrates an example of a beam failure recovery procedure.

FIG. 11 is a flowchart illustrating an example of a BFR procedure.

Referring to FIG. 11, the BFR procedure includes (1) a BFD step (S1410), (2) a new beam identification step (S1420), (3) a BFR request (BFRQ) step (S1430), and (4) a step of monitoring a response to a BFRQ from the gNB (S1440).

Here, for step (3), i.e., for BFRQ transmission, a PRACH preamble or a PUCCH may be used.

Step (1), i.e., BFD, will be described in more detail. When block error rates (BLER) of all serving beams are equal to or greater than a threshold, this is called a beam failure instance. RSs (qo) to be monitored by the UE are explicitly configured by RRC or implicitly determined by beam RSs for a control channel. An indication of the beam failure instance to the higher layer is periodic, and an indication interval is determined by the lowest period of BFD RSs. If evaluation is lower than a beam failure instance BLER threshold, an indication to the higher layer is not performed. When N consecutive beam failure instances occur, beam failure is declared. Here, N is a parameter NrofBeamFailureInstance configured by RRC. A 1-port CSI-RS and an SSB are supported for a BFD RSset.

Next, step (2), i.e., a new beam indication, will be described. A network may configure one or multiple PRACH resources/sequences for the UE. The PRACH sequences are mapped to at least one new candidate beam. The UE selects a new beam from among candidate beams in which L1-RSRP is equal to or greater than a threshold configured by RRC and transmits a PRACH through the selected beam. In this case, which beam the UE selects may be an implementation issue of the UE.

Next, steps of (3) and (4), i.e., BFRQ transmission and monitoring of the response to the BFRQ, will be described. For the UE to monitor a time duration of a window and a response of the gNB to the BFRQ, a dedicated CORESET may be configured by RRC. The UE starts monitoring after 4 slots of PRACH transmission. The UE assumes that the dedicated CORESET is spatially QCLed with a DL RS of a UE-identified candidate beam in a BFRQ. If a timer expires or the number of PRACH transmissions reaches a maximum number, the UE stops performing the BFR procedure. Here, the maximum number of PRACH transmissions and a timer are configured by RRC.

The symbols/abbreviations/terms used in the present specification are as follows:
- PDCCH: Physical Downlink Control CHannel
- PDSCH: Physical Downlink Shared CHannel
- PUSCH: Physical Uplink Shared CHannel
- CSI: Channel state information
- MCCH: Multicast Control Channel
- MTCH: Multicast Traffic Channel
- RRM: Radio resource management
- RLM: Radio link monitoring
- DCI: Downlink Control Information
- CAP: Channel Access Procedure
- Ucell: Unlicensed cell
- PCell: Primary Cell
- PSCell: Primary SCG Cell
- TBS: Transport Block Size
- SLIV: Starting and Length Indicator Value (As an indication field for a starting symbol index and number of symbols in a slot of a PDSCH and/or a PUSCH, SLIV is carried on a PDCCH scheduling the corresponding PDSCH and/or PUSCH.)
- BWP: BandWidth Part (BWP may be composed of continuous RBs on the frequency axis and may correspond to one numerology (e.g., a sub-carrier spacing, a CP length, or a slot/mini-slot duration). In addition, multiple BWPs may be configured in one carrier (the number of BWPs per carrier may also be limited), but the number of activated BWPs may be limited to a part (e.g., 1) of the BWPs per carrier.)

CORESET: COntrol REsourse SET (CORESET means a time frequency resource region in which a PDCCH may be transmitted, and the number of CORESETs per BWP may be limited.)

REG: Resource Element Group

SFI: Slot Format Indicator (As an indicator indicating a symbol-level DL/UL direction in specific slot(s), SFI is transmitted through a group common PDCCH.)

COT: Channel occupancy time

SPS: Semi-persistent scheduling

PLMN ID: Public Land Mobile Network identifier

RACH: Random Access Channel

RAR: Random Access Response

Msg3: Message transmitted on UL-SCH containing a C-RNTI MAC CE or CCCH SDU, submitted from upper layer and associated with the UE Contention Resolution Identity, as part of a Random Access procedure.

Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

Serving Cell: A PCell, a PSCell, or an SCell

The above-described contents (the 3GPP system, the frame structure, the NR system, etc.) may be applied in combination with methods proposed in the present disclosure to be described later or may be supplemented to clarify the technical features of the methods proposed in the present disclosure. In this document, '/' means 'and', 'or', or 'and/or' depending on context.

The NR UE supports beamforming-based reception in DL reception. That is, the UE receives a DL signal using a specific beam among a plurality of candidate beams. In particular, when the UE is in a connected mode, the gNB and the UE may maintain an optimal beam for the UE through BM procedures. Therefore, the gNB transmits a PDCCH/PDSCH using an optimal Tx beam suitable for the UE, and the UE receives the PDCCH/PDSCH with an optimal Rx beam.

In REL-17 NR, a method of reducing power consumption of the UE for a UE in a stationary or low mobility state is being discussed. In the case of the UE in a stationary state or the UE that moves only in a specific space such as an indoor space or a factory, there is a high possibility of maintaining an optimal beam for a long time. In the NR system for measuring a plurality of beams, there may be a big problem in that the UE wastes power in order to measure a plurality of beams, and the present disclosure proposes efficient BFD and beam recovery operations for the UE with low or limited mobility.

In the present disclosure, when the network designates a UE as a UE in a stationary state, a UE with low mobility, or a UE with limited mobility or when a UE determines that it is in a stationary state, a low mobility state, or a limited mobility state, a UE satisfying a specific condition designated by the gNB may perform a relaxed BFD procedure or may not perform a BFD procedure. In addition, when a BFR RACH is triggered due to the relaxed BFD procedure, the BFR RACH may be performed by configuring an RACH for the relaxed BFD procedure.

When the UE moves from a stationary state or starts to move at a predetermined speed or more, the relaxed BFD procedure of the present disclosure may be switched to a normal BFD procedure. Alternatively, when the UE moves from a stationary state or starts to move at a predetermined speed or more, a BFD procedure which has been stopped may be resumed. Conversely, when the UE becomes in a stationary state or starts to move at a predetermined speed or less, the normal BFD procedure of the present disclosure may be switched to the relaxed BFD procedure, or a BFD procedure which has been performed may be temporarily stopped.

1) Transmitter (gNB)

In the present disclosure, the gNB may discern whether a UE is in a stationary state, a low mobility state, or a limited mobility state. For example, the gNB may distinguish the state of the UE according to subscriber information provided by a core network node. Alternatively, the gNB may check the state of the UE by continuously identifying the location of the UE through a positioning scheme or frequency of occurrence of handover.

When the UE is in the above state, the gNB may instruct the UE to perform a relaxed BFD procedure or to temporarily stop a BFD procedure.

Figure 12:
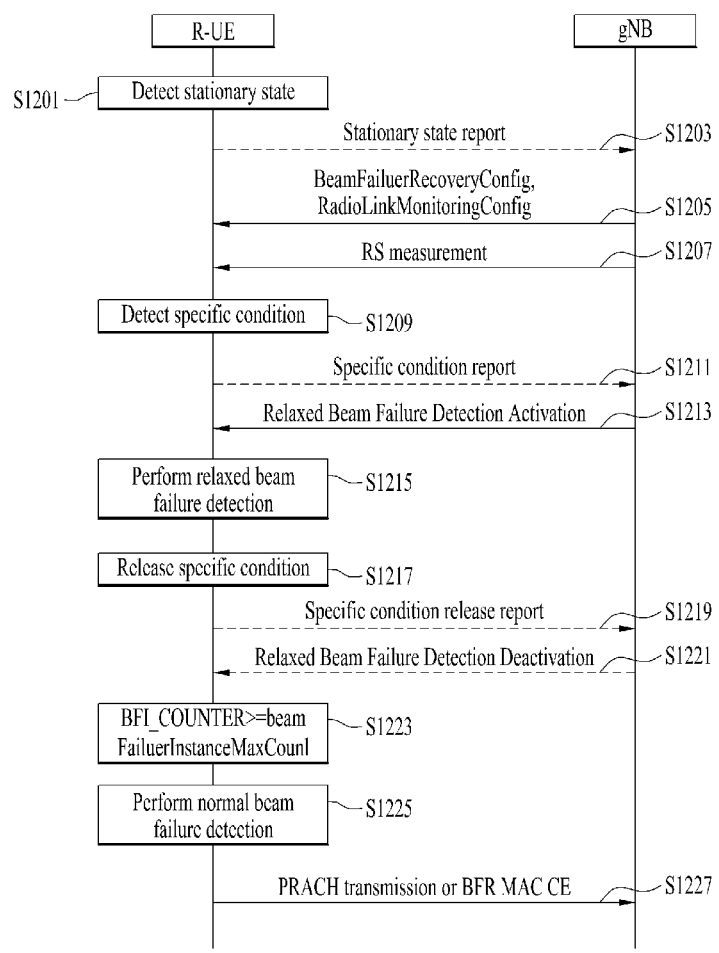
FIG. 12 illustrates an example of beam failure detection and beam failure recovery procedure of the present disclosure.

FIG. 12 is a diagram illustrating BFD and BFR procedures according to various embodiments.

In FIG. 12, the UE detects a stationary state (S1201). In this case, the UE may report a stationary state, a low mobility state, or a limited mobility state to the gNB (S1203). The gNB may configure a relaxed BSD procedure for the UE through a state report of the UE or through subscriber information. For example, the gNB may transmit BFR configuration information BeamFailureRecoveryConfig and RLM configuration information RadioLinkMonitoringConfig to the UE to cause the UE to perform a BFR operation (S1205).

The BFR configuration information BeamFailureRecoveryConfig and the RLM configuration information RadioLinkMonitoringConfig may include parameters shown in Table 12 below.

TABLE 12 beamFailureInstanceMaxCount for the beam failure detection;
beamFailureDetectionTimer for the beam failure detection;
beamFailureReoveryTimer for the beam failure recovery procedure;
rsrp-ThresholdSSB: an RSRP threshold for the beam failure recovery;
powerRampingStep: powerRampingStep for the SpCell beam failure recovery;
powerRampingStepHighPriority: powerRampingStepHighPriority for the SpCell beam failure recovery;
preambleReceivedTargetPower: preambleReceivedTargetPower for the SpCell beam failure recovery;
preambleTransMax: preambleTransMax for the SpCell beam failure recovery;
scalingFactorBI: scalingFactorBI for the SpCell beam failure recovery;
ssb-perRACH-Occasion: ssb-perRACH-Occasion for the SpCell beam failure recovery;
ra-ResponseWindow: the time window to monitor response(s) for the SpCell beam failure recovery using contention-free Random Access Preamble;
prach-ConfigurationIndex: prach-ConfigurationIndex for the SpCell beam failure recovery;
ra-ssb-OccasionMaskIndex: ra-ssb-OccasionMaskIndex for the SpCell beam failure recovery;
ra-OccasionList: ra-OccasionList for the SpCell beam failure recovery.
The following UE variables are used for the beam failure detection procedure;
BFI_COUNTER (per Serving Cell): counter for beam failure instance indication which is initially set to 0.

Upon detecting a specific condition described in the present disclosure through RS measurement for RLM (S1209), the UE performs a relaxed BFD procedure or temporarily stops a BFD procedure by decision thereof or according to instruction by the gNB (S1215). For example, when the UE detects a specific condition, the UE reports the detected condition to the gNB (S1211), and the gNB receiving the report may activate the relaxed BFD procedure (S1213). The instruction for activation may be delivered to the UE through DCI or a MAC CE. Alternatively, when the UE detects the state thereof without instruction for activation by the gNB, the UE may activate the relaxed BFD procedure.

When the UE confirms that the specific condition described in the present disclosure is released through RS measurement for RLM (S1217), the UE performs a normal BFD procedure or resumes a BFD procedure by decision thereof or according to instruction by the gNB. For example, when the UE detects release of a specific condition, the UE reports release of the specific condition to the gNB (S1219), and the gNB receiving the report may deactivate the relaxed BFD procedure or instruct the UE to perform the normal BFD procedure (S1221). Such instruction may be delivered to the UE through the DCI or the MAC CE. Alternatively, when the UE detects release of the specific condition without instruction for deactivation by the gNB, the UE may deactivate the relaxed BFD procedure and transition to the normal BFD procedure or may resume a BFD procedure which has been temporarily stopped (S1223).

When a condition of BFI_COUNTER>=beamFailureInstanceMaxCount is satisfied according to the normal BFD or relaxed BFD procedure (S1225), the UE may start PRACH transmission in an SpCell or report a BFR in an SCell to the gNB (S1227).

2) Receiver (UE)

In the present disclosure, when the network designates a UE as a UE in a stationary state or a UE with low mobility or when a UE determines that it is in a low mobility state, the UE may perform a relaxed BFD procedure or may not perform a BFD procedure, as follows. In contrast, when the UE moves from a stationary state or starts to move at a predetermined speed or more, the relaxed BFD procedure of the present disclosure may be switched to a normal BFD procedure. Alternatively, when the UE moves from a stationary state or starts to move at a predetermined speed or more, the UE may resume a BFD procedure which has been stopped.

The UE is configured with an RRC parameter RadioLinkMonitoringRS for RLM with respect to each DL BWP of an SpCell by the gNB. For example, a higher layer parameter RadioLinkMonitoringRS having a CSI-RS resource configuration index csi-RS-Index or an SS/PBCH block index ssb-Index is provided to the UE. When RadioLinkMonitoringRS is not provided to the UE and the UE is provided with a TCI state for a PDCCH including one or more RSs including one or more of a CSI-RS and/or an SS/PBCH block,

- if an active TCI state for the PDCCH includes only one RS, the UE uses, for RLM, the RS provided with respect to the active TCI state for the PDCCH.
- if the active TCI state for the PDCCH includes two RSs, the UE expects that one RS will have QCL-TypeD and the UE will use one RS for RLM. Here, the UE does not expect that all of the two RSs will have QCL-TypeD.

The UE does not use an aperiodic RS for RLM.

In this way, when an RS used or provided for RLM (hereinafter referred to as an RS for RLM) is configured, the UE performs a BFD procedure by measuring the RS for RLM.

Method 1: Method of Temporarily Stopping BFD Based on Specific Condition of Quality of Active RS or Best RS If a measurement value of a current active beam RS or the best beam RS is greater than or equal to a threshold, the UE does not perform a BFD procedure for a predetermined time.

Scheme 1-1: If RSRP values of all RSs for RLM are greater than or equal to a certain threshold for a time T1, the UE temporarily stops the BFD procedure for a time T2. However, if the RSRP values are less than the certain threshold for the time T1, the UE performs the BFD procedure for the next time T2 or resumes the BFD procedure which has been temporarily stopped.

Scheme 1-2: If an RSRP value of the best RS among RSs for RLM is greater than or equal to the certain threshold for the time T1, the UE temporarily stops the BFD procedure for the time T2. However, if the RSRP value is less than the certain threshold for the time T1, the UE performs the BFD procedure for the next time T2 or resumes the BFD procedure which has been temporarily stopped.

Scheme 1-3: If an average RSRP value of all RSs for RLM is greater than or equal to the certain threshold for the time T1, the UE temporarily stops the BFD procedure for the time T2. However, if the average RSRP value is less than the certain threshold for the time T1, the UE performs the BFD procedure for the next time T2 or resumes the BFD procedure which has been temporarily stopped.

T1, T2, and the certain threshold are configured by the gNB.

After the time T2, the UE measures RSs for RLM again. In this case, the UE measures only the previous best RS, measures only RSs for RLM, which are greater than or equal to the certain threshold, or measures all the RSs for RLM. As a result of measurement, the UE temporarily stops the BFD procedure for the time T2 according to Scheme 1-1, Scheme 1-2, or Scheme 1-3.

In this way, when a specific condition for temporarily stopping BFD is satisfied or is not satisfied, the UE may report this fact to the gNB.

Method 2: Method of Performing Relaxed BFD Based on Specific Condition of Quality of Active RS or Best RS If a measurement value of a current active beam RS or the best beam RS is greater than or equal to a threshold, the UE performs a relaxed BFD procedure for a predetermined time and, if the measurement value is less than the threshold, the UE performs a normal BFD procedure for the predetermined time.

Scheme 2-1: If RSRP values of all RSs for RLM are greater than or equal to a certain threshold for a time T1, the UE performs relaxed BFD for a time T2. However, if the RSRP values are less than the certain threshold for the time T1, the UE performs the normal BFD procedure for the next time T2.

Scheme 2-2: If an RSRP value of the best RS among RSs for RLM is greater than or equal to the certain threshold for the time T1, the UE performs the relaxed BFD procedure for the time T2. However, if the RSRP value is less than the certain threshold for the time T1, the UE performs the normal BFD procedure for the time T2.

Scheme 2-3: If an average RSRP value of all RSs for RLM is greater than or equal to the certain threshold for the time T1, the UE performs the relaxed BFD procedure for the time T2. However, if the average RSRP value is less than the certain threshold for the time T1, the UE performs the normal BFD procedure for the next time T2.

T1, T2, and the certain threshold are configured by the gNB.

In this way, when a condition for relaxed BFD is satisfied or is not satisfied, the UE may report this fact to the gNB.

Method 3: Method of Temporarily Stopping BFD Based on Specific Condition of In-Synchronization or Out-of-Synchronization If the number of in-synchronization (IS) indications is greater than or equal to N1 for a predetermined time, the UE does not perform a BFD procedure for the predetermined time. Next, if the number of out-of-synchronization (OOS) indications is greater than or equal to N2 for the predetermined time, the UE performs the BFD procedure for the predetermined time.

Specifically, if the number of IS indications is greater than or equal to N1 for a time T1, or if the number of OOS indications is less than or equal to N2 for the time T1, the UE temporarily stops the BFD procedure for a time T2. However, if the number of IS indications is less than or equal to N1 for the time T1 or if the number of OOS indications is greater than or equal to N2 for the time T1, the UE continues to perform the BFD procedure for the next time T2 or resumes the BFD procedure which has been temporarily stopped.

After the time T2, the UE measures RSs for RLM again. In this case, the UE measures only the previous best RS, measures only RSs for RLM, which are greater than or equal to a certain threshold, or measures all RSs for RLM. As a result of measurement, the UE may temporarily stop the BFD procedure for the time T2 according to the above method.

T1, T2, N1, and N2 are configured by the gNB.

In this way, when a specific condition for temporarily stopping BFD is satisfied or a specific condition for resuming BFD is satisfied, the UE may report this fact to the gNB.

Method 4: Method of Performing Relaxed BFD Based on Specific Condition of IS or OOS If the number of IS indications is greater than or equal to N1 for a predetermined time, the UE performs a relaxed BFD procedure for the predetermined time. Next, if the number of OOS indications is greater than or equal to N2 for the predetermined time, the UE performs a normal BFD procedure for the predetermined time.

Specifically, if the number of IS indications is greater than or equal to N1 for a time T1, or if the number of OOS indications is less than or equal to N2 for the time T1, the UE performs the relaxed BFD procedure for a time T2. However, if the number of IS indications is less than or equal to N1 for the time T1 or if the number of OOS indications is greater than or equal to N2 for the time T1, the UE performs the normal BFD for the next time T2.

After the time T2, the UE measures RSs for RLM again. In this case, the UE measures only the previous best RS, measures only RSs for RLM, which are equal to or greater than a certain threshold, or measures all RSs for RLM. As a result of measurement, the UE may perform a BFD procedure or perform the BFD procedure only with an RS for RLM of the current best quality, for the time T2 according to the above method.

T1, T2, N1, and N2 are configured by the gNB.

In this way, when the above specific condition is satisfied or is not satisfied, the UE may report this fact to the gNB.

Scheme of Temporarily Stopping and Resuming BFD

When BFD is deactivated by a specific condition of the present disclosure, the UE performs a part or all of the following processes while temporarily stopping BFD.

If BFD is temporarily stopped, BFD parameters and variables are all initialized.

If BFD is temporarily stopped, a BFI_COUNTER value is set to 0.

If BFD is temporarily stopped, beamFailureDetectionTimer is stopped.

If BFD is temporarily stopped, beamFailureRecoveryTimer is stopped.

If BFD is temporarily stopped, when an RACH for BFR has already been triggered or is in progress, the RACH is stopped.

If BFD is temporarily stopped, all triggered BFR procedures are cancelled.

If BFD is temporarily stopped, an already generated BFR MAC CE is cancelled or transmission of a TB including only the BFR MAC CE is stopped. However, transmission of a TB including data different from the BFR MAC CE is not stopped.

Alternatively, even when a specific condition of the present disclosure is satisfied, if one of the following cases is satisfied, BFD is not temporarily stopped.

Case in which BFI_COUNTER>=beamFailureInstanceMaxCount

Case in which BFR has already been triggered

Case in which a BFR MAC CE has already been generated

Case in which an RACH for BFR has already been triggered or is in progress

Case in which BFD is being performed in a specific BWP

Case in which BFD is being performed with respect to a specific cell

For example, BFD of an SCell, BFD of an SpCell (i.e., a PCell or a PSCell), BFD of a secondary cell group (SCG) cell, or BFD of a master cell group (MCG) cell is not temporarily stopped by instruction by the gNB.

Relaxed BFD Scheme

When relaxed BFD is activated by the above specific condition, the UE may perform relaxed BFD by monitoring RSs according to a separate configuration. For example, the gNB may configure differentiated RSs as follows.

1) RS configuration for normal BFD:
failureDetectionResourcesToAddModList SEQUENCE (SIZE(1 maxNrofFailureDetectionResources)) OF RadioLinkMonitoringRS 2) RS configuration for relaxed BFD:
Relaxed-failureDetectionResourcesToAddModList SEQUENCE (SIZE(1 maxNrofFailureDetectionResources)) OF RadioLinkMonitoringRS If there is only an RS configuration for normal BFD, the UE may perform relaxed BFD using only a limited number of RSs (e.g., best RSs or active RSs) among RSs.

Meanwhile, upon performing relaxed BFD, the UE performs RS measurement at intervals of a predetermined time X1 or N1 times. When performing normal BFD, the UE performs RS measurement at intervals of a predetermined time X2 or N2 times. In this case, X1 is a longer time interval than X2, and N1 is a smaller number than N2. Such RS measurement may be applied only to an RS configuration for a BFR RACH caused by relaxed BFD when RS configurations for the BFR RACH are distinguished. If the RS configurations for the BFR RACH are not distinguished, RS measurement may be applied to an RS configuration for a BFR RACH caused by normal BFD. In this case, T1, T2, X1, X2, N1, N2, and a certain threshold are configured by the gNB.

In addition, upon performing relaxed BFD, the UE may perform RS measurement only using active RSs or best RSs for a predetermined time. However, upon performing normal BFD, the UE may perform RS measurement for all configured RSs for RLM for the predetermined time.

When relaxed BFD is activated by the above specific condition, the UE performs the relaxed BFD procedure as follows.

If relaxed BFD is activated, all BFD parameters and variables are initialized.

If relaxed BFD is activated, BFI_COUNTER value is set to 0.

If the gNB separately configures a beamFailureDetectionTimer value for relaxed BFD, the UE performs BFD by applying the beamFailureDetectionTimer value for relaxed BFD.

When relaxed BFD is activated, the beamFailureDetectionTimer value for relaxed BFD is applied while stopping beamFailureDetectionTimer or re-starting a timer which has already been started.

For example, the beamFailureDetectionTimer value for relaxed BFD may be set to be larger than a value for normal BFD.

If the gNB separately sets the beamFailureRecoveryTimer value for relaxed BFD, the UE performs BFD by applying the beamFailureRecoveryTimer value for relaxed BFD.

When relaxed BFD is activated, the UE applies the beamFailureRecoveryTimer value for relaxed BFD while stopping the beamFailureRecoveryTimer or re-starting the timer which has already been started.

If the gNB separately sets beamFailureInstanceMaxCount value for relaxed BFD, the UE performs BFD by applying the beamFailureInstanceMaxCount value for relaxed BFD.

For example, the beamFailureInstanceMaxCount value for relaxed BFD may be larger than a value for normal BFD and, in this case, the possibility of triggering BFR is reduced. If a delay tolerant service is used, the beamFailureInstanceMaxCount value may be set to be less sensitive by reducing the possibility of triggering BFR.

Alternatively, the beamFailureInstanceMaxCount value for relaxed BFD may be smaller than the value for normal BFD and, in this case, the possibility of triggering BFR increases. That is, the beamFailureInstanceMaxCount value may be set to be sensitive by increasing the possibility of triggering BFR.

If an RACH for BFR has already been triggered or is in progress before relaxed BFD is activated, an RACH is stopped.

If BFR has already been triggered before relaxed BFD is activated, all triggered BFR procedures are canceled.

If a BFR MAC CE has already been generated before relaxed BFD is activated, transmission of the BFR MAC CE is stopped.

When BFI_COUNTER>=beamFailureInstanceMaxCount, the UE performing relaxed BFD triggers BFR for an SCell and triggers an RACH for BFR for an SpCell. In this case, the beamFailureInstanceMaxCount value for relaxed BFD is applied.

If the gNB separately sets a BFR RACH configuration for relaxed BFD, the UE applies the BFR RACH configuration for relaxed BFD. For example, the gNB may set some or all of the following parameters to separate values to perform a BFR RACH triggered by relaxed BFD, and the UE may perform the BFR RACH by setting parameters as separate values as shown in Table 14.

TABLE 13 rsrp-ThresholdSSB: an RSRP threshold for the beam failure recovery;
powerRampingStep: powerRampingStep for the SpCell beam failure recovery;
powerRampingStepHighPriority: powerRampingStepHighPriority for the SpCell beam failure recovery;
preambleReceivedTargetPower: preambleReceivedTargetPower for the SpCell beam failure recovery;
preambleTransMax: preambleTransmax for the SpCell beam failure recovery;
scalingFactorBI: scalingFactorBI for the SpCell beam failure recovery;
ssb-perRACH-Occasion: ssb-perRACH-Occasion for the SpCell beam failure recovery;
ra-ResponseWindow: the time window to monitor response(s) for the SpCell beam failure recovery using contention-free Random Access Preamble;
prach-ConfigurationIndex: prach-ConfigurationIndex for the SpCell beam failure recovery;
ra-ssb-OccasionMarkIndex: ra-ssb-OccasionMaskIndex for the SpCell beam failure recovery;
ra-OccasionList: ra-OccasionList for the SpCell beam failure recovery.

When the BFR RACH is triggered, the UE may measure an RS for candidateBeamRS to transmit a PRACH preamble using a PRACH resource mapped to the best beam RS. In this case, the gNB may configure a separate candidate RS for the BFR RACH for relaxed BFD as follows.

1) RS configuration for the BFR RACH due to normal BFD
    candidateBeamRSList SEQUENCE (SIZE(1 . . . maxNrofCandidateBeams)) OF PRACH-ResourceDedicatedBFR
2) RS configuration for BFR RACH due to relaxed BFD
    candidateBeamRSList SEQUENCE (SIZE(1 . . . maxNrofCandidateBeams)) OF PRACH-ResourceDedicatedBFR When the gNB separately sets the BFR RACH configuration for relaxed BFD, the UE applies the BFR RACH configuration for relaxed BFD. For example, as shown in Table 14 below, a BFR RACH preamble resource triggered by relaxed BFD and a BFR RACH preamble resource triggered by normal BFD may be distinguished. Accordingly, the gNB may discern for which candidate RS the UE has performed BFR.

TABLE 14

BFR-SSB-Resource
   ssb                         SSB-Index,
   ra-PreambleIndex     INTEGER (0..63),
Relaxed-BFR-SSB-Resource
   ssb                         SSB-Index,
   ra-PreambleIndex     INTEGER (0..63),
BFR-CSIRS-Resource
   csi-RS                    NZP-CSI-RS-ResourceId,
   ra-OccasionList      SEQUENCE (SIZE(1..maxRA-OccasionsPerCSIRS)) OF INTEGER (0..maxRA-Occasions-1)
   ra-PreambleIndex     INTEGER (0..63)
Relaxed-BFR-CSIRS-Resource
   csi-RS                    NZP-CSI-RS-ResourceId,
   ra-OccasionList      SEQUENCE (SIZE(1..maxRA-OccasionsPerCSIRS)) O FINTEGER (0..maxRA-Occasions-1)
   ra-PreambleIndex     INTEGER (0..63)

After transmitting a PRACH preamble, the UE performs PDCCH monitoring through a search space indicated by recoverySearchSpaceId to receive DCI, which is RACH MSG2, and receive an RAR MAC CE indicated by the DCI. If the RAR MAC CE includes a RAPID selected by the UE, it is determined that the BFR RACH has been successfully terminated.

Figure 13:
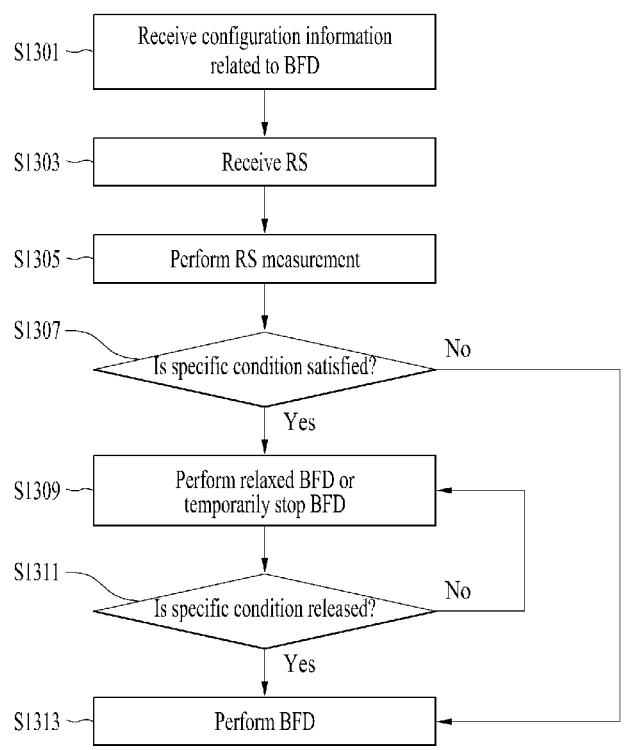
FIG. 13 illustrates a method of performing beam failure detection by a user equipment in various embodiments of the present disclosure.

FIG. 13 illustrates a method of performing BFD by a UE according to various embodiments.

The UE receives configuration information related to BFD (S1301). In more detail, the UE receives RLM configuration information for BFD.

The UE receives an RS based on the configuration information (S1303).

The UE measures the RS by performing RLM for BFD (S1305).

When a specific condition is satisfied, the UE may perform a relaxed BFD procedure or may temporarily stop a BFD procedure (S1307 and S1309). If the specific condition is not satisfied, the UE performs a normal BFD procedure (S1307 and S1313).

The specific condition may include the case in which quality of active RSs (all RSs for RLM of a serving cell) or best RSs (RSs corresponding to beams having the best quality) is greater than or equal to a threshold.

Alternatively, the specific condition may be determined based on the case in which the number of IS indications is greater than or equal to N1 for a predetermined time, or the number of OOS indications is less than N2 for the predetermined time.

In an exemplary embodiment, when the UE detects a specific condition through RS measurement for RLM, the UE performs the relaxed BFD procedure or temporarily stops a BFD procedure by decision thereof or according to instruction by the gNB.

In an exemplary embodiment, upon detecting the specific condition, the UE reports the specific condition to the gNB, and the gNB receiving the report may activate the relaxed BFD procedure.

When the specific condition is released, the UE performs the normal BFD procedure (S1311 and S1313).

When an RACH for BFR is triggered, the UE may transmit a preamble using different RACH preamble resources depending on which of relaxed BFD and normal BFD has been performed.

As disclosed above, in the present disclosure, a UE with low mobility such as a stationary UE performs a relaxed BFD procedure and a BFR operation under a specific condition, thereby reducing power consumption of the UE upon performing BFD and BFR.

Figure 14:
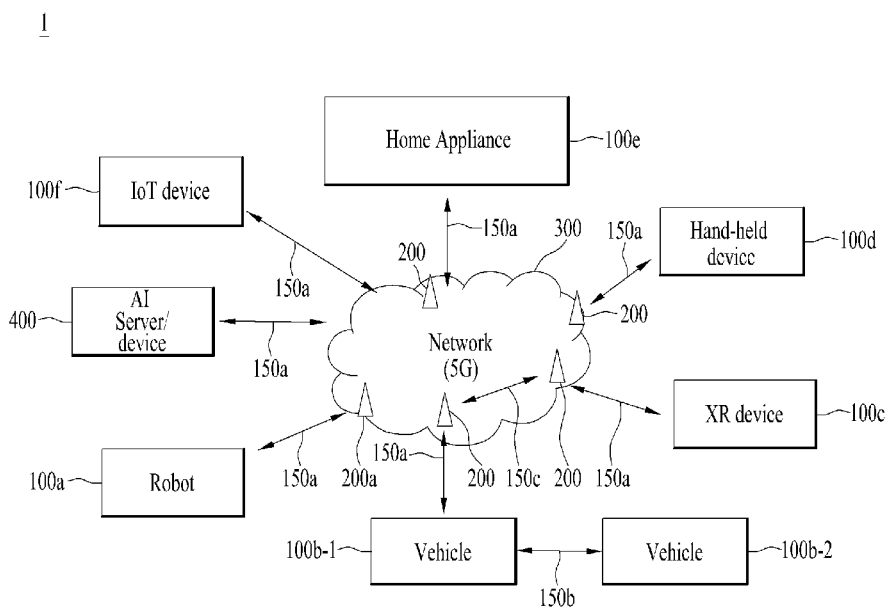
FIG. 14 to FIG. 17 illustrate a communication system 1 and wireless devices applied to the present disclosure.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
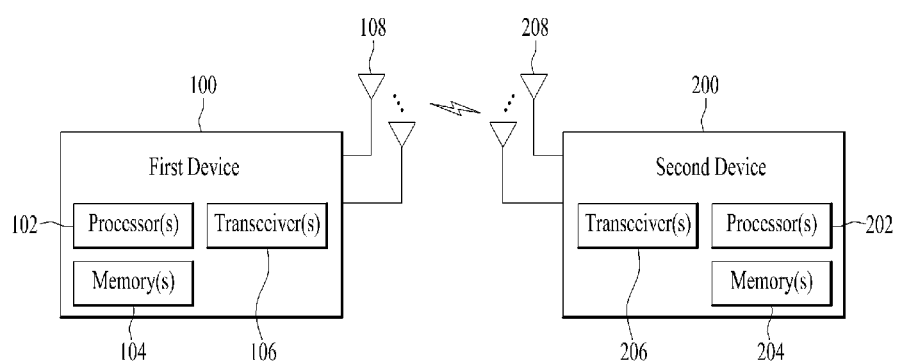

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
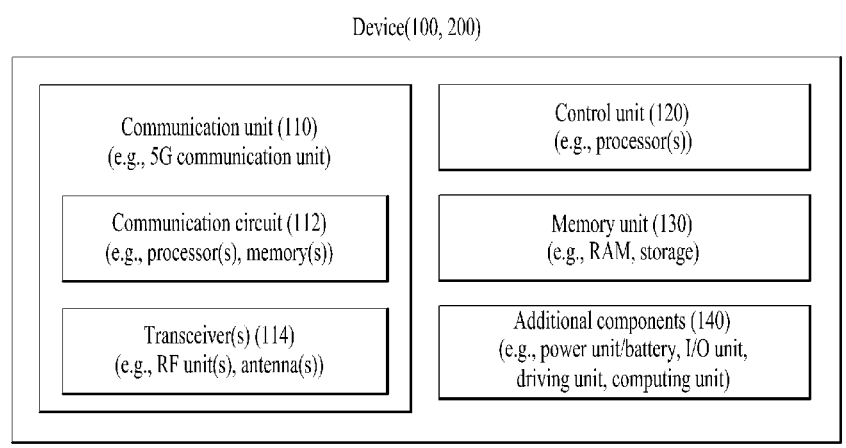

FIG. 16 illustrates another example of a wireless device applied to the present disclosure. The wireless device may be implemented in various forms according to a use-case/service (refer to FIG. 15).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
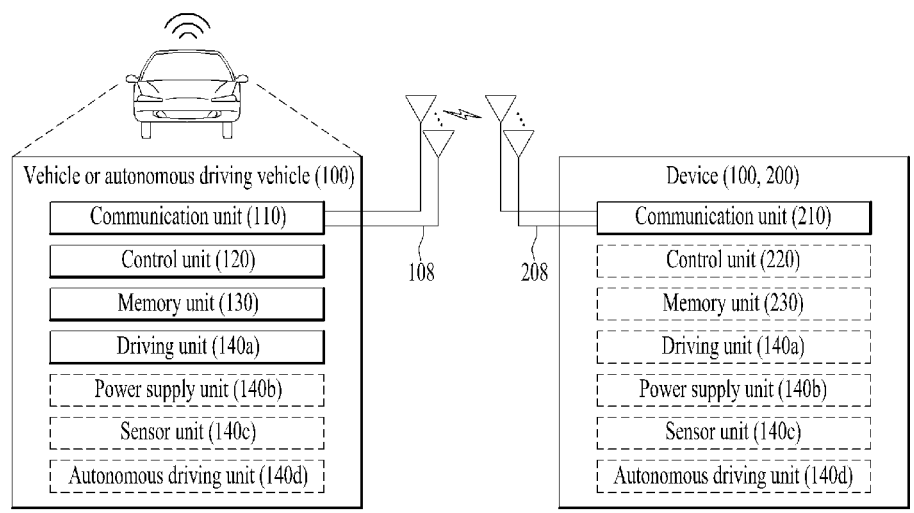

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 18:
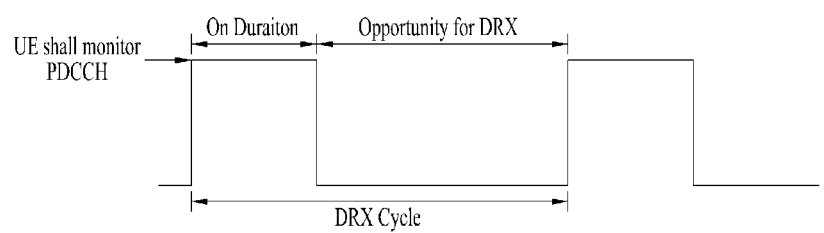
FIG. 18 illustrates an exemplary discontinuous reception (DRX) operation applied to the present disclosure.

FIG. 18 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 18, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 15 describes a DRX operation of a UE (in the RRC_CONNECTED state). Referring to Table 15, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 15

| | Type of signals | UE procedure |
| --- | --- | --- |
| $1^{st}$ step | RRC signalling(MAC-CellGroupConfig) | Receive DRX configuration information |
| $2^{nd}$ Step | MAC CE((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of transmitting and receiving a signal by a user equipment (UE) in a wireless communication system, the method comprising:
receiving radio link monitoring (RLM) configuration information for a beam failure detection (BFD);
receiving beam failure recovery (BFR) configuration information;
performing a first BFD on reference signals (RSs) included in the RLM configuration information in a first time period; and
performing a second BFD in a second time period based on all measurement values for the RSs in the first time period being above a preconfigured specific threshold,
wherein the second BFD is performed for a limited number of at least one RS that is limited in number than the RSs on which the first BFD is performed, and
wherein the BFR configuration information independently configures a random access channel (RACH) resource related to a BFR triggered by the first BFD and the RACH resource related to the BFR triggered by the second BFD.

2. The method of claim 1,
wherein the RLM configuration information further includes information about an RS measurement time interval, information about a number of times of RS measurement, and information about an RS measurement period for each of the first BFD and the second BFD.

3. The method of claim 2,
wherein the RS measurement time interval for the second BFD is set to be greater than or equal to an RS measurement time interval for the first BFD,
the number of times of RS measurement for the second BFD is set to be less than or equal to the number of times of RS measurement for the first BFD, and
the RS measurement period for the second BFD is set to be greater than or equal to an RS measurement period for the first BFD.

4. The method of claim 1,
wherein the RLM configuration information further includes information about a number of times of occurrence of a first beam failure event for triggering BFR based on performance of the second BFD procedure and information about a number of times of occurrence of a second beam failure event for triggering BFR based on performance of the first BFD procedure, and
wherein the number of times of the first beam failure event is differently set from the number of times of the second beam failure event.

5. The method of claim 1,
wherein
the UE performs the second BFD based on a separately configured timer for performing the second BFD in the second time period.

6. A non-volatile computer readable medium in which program code for performing the method of claim 1 is recorded.

7. A user equipment (UE) operating in a wireless communication system, the UE comprising:
a transceiver; and
one or more processors connected to the transceiver,
wherein the one or more processors are configured to:
receive radio link monitoring (RLM) configuration information for a beam failure detection (BFD);
receive beam failure recovery (BFR) configuration information;
perform a first BFD on reference signals (RSs) included in the RLM configuration information in a first time period; and
perform a second BFD in a second time period based on all measurement values for the RSs in the first time period being above a preconfigured specific threshold,
wherein the second BFD is performed for a limited number of at least one RS that is limited in number than the RSs on which the first BFD is performed, and
wherein the BFR configuration information independently configures a random access channel (RACH) resource related to a BFR triggered by the first BFD and the RACH resource related to the BFR triggered by the second BFD.

8. The UE of claim 7,
wherein the RLM configuration information further includes information about an RS measurement time interval, information about a number of times of RS measurement, and information about an RS measurement period for each of the first BFD and the second BFD.

* * * * *